(12) United States Patent
Nunez

(10) Patent No.: US 6,687,711 B1
(45) Date of Patent: Feb. 3, 2004

(54) KEYWORD AND METHODS FOR USING A KEYWORD

(75) Inventor: Chris Nunez, Trabuco Canyon, CA (US)

(73) Assignee: Centor Software Corporation, Irvine, CA (US)

(*) Notice: Subject to any disclaimer, the term of this patent is extended or adjusted under 35 U.S.C. 154(b) by 277 days.

(21) Appl. No.: 09/730,496

(22) Filed: Dec. 4, 2000

(51) Int. Cl.[7] .................................................. G06F 17/30
(52) U.S. Cl. ............................................ 707/104.1; 707/3
(58) Field of Search ................................. 707/1, 2, 3, 4, 707/5, 6, 7, 8, 9, 10, 100, 101, 102, 104.1, 513, 203, 164.1; 715/513, 501.1, 515, 517; 711/202, 137; 345/760

(56) References Cited

U.S. PATENT DOCUMENTS

| | | | |
|---|---|---|---|
| 5,357,631 A | 10/1994 | Howell et al. | 707/203 |
| 5,649,186 A | 7/1997 | Ferguson | 707/10 |
| 5,649,218 A | 7/1997 | Saito | 715/513 |
| 5,708,806 A | 1/1998 | De Rose et al. | 707/164.1 |
| 5,708,825 A | 1/1998 | Sotomayor | 715/501.1 |
| 5,761,684 A | 6/1998 | Gibson | 715/515 |
| 5,848,410 A | 12/1998 | Walls et al. | 707/4 |
| 5,903,902 A | 5/1999 | Orr et al. | 715/517 |
| 5,973,696 A | 10/1999 | Agranat et al. | 345/760 |
| 5,983,234 A | 11/1999 | Tietjen et al. | 711/137 |
| 5,987,480 A | 11/1999 | Donohue et al. | 715/501.1 |
| 6,014,678 A | 1/2000 | Inoue et al. | 715/501.1 |
| 6,026,474 A | 2/2000 | Carter et al. | 711/202 |
| 6,292,802 B1 * | 9/2001 | Kessenich et al. | 707/101 |
| 6,356,897 B1 * | 3/2002 | Gusack | 707/4 |

OTHER PUBLICATIONS

*Locating Information with Zdex*, by Tracy Ryan, Product Manager, pp. 1–6, Sequioa Software Corporation, www.sequoiasoftware.com.

* cited by examiner

Primary Examiner—Diane D. Mizrahi
Assistant Examiner—Yicun Wu
(74) Attorney, Agent, or Firm—Brown Raysman Millstein Felder & Steiner LLP

(57) ABSTRACT

Systems and methods are provided for data storage and retrieval in which data is stored in a file storage system and keywords are associated with the data. The keywords include parameters of the data and associated values for the parameters. The keywords are collected together in indexes of the data, and various methods are used on the keywords or the indexes of keywords. These methods include index creation methods, searching methods, and data conversion methods.

9 Claims, 6 Drawing Sheets

```
<HTML>
<HEAD>
<META HTTP-EQUIV="CONTENT-TYPE" CONTENT="TEXT/HTML; CHARSET=WINDOWS=1252">
<META NAME="GENERATOR" CONTENT="MICROSOFT WORD 97">
<!S="AUTHOR">BOB RICHARDS<!S>                ——10a
<!S="SUBJECT"> BEAKER<!S>                    ——10b1
<!S="SUBJECT"> DELIVERIES<!S>                ——10b2
<!S="SUBJECT"> SALES<!S>                     ——10b3
<!S="DATE WRITTEN">JULY 21, 2000<!S>         ——10c
<!S="CAPACITY (mL)">500<!S>                  ——10d
<!S="MATERIAL OF MANUFACTURE">TEMPERED GLASS<!S>  ——10e
<!S="TEMPERATURE MAXIMUM(F)">212<!S>         ——10f
<!S="TEMPERATURE MAXIMUM(C)">100<!S>         ——10g
<!S="PRESSURE RESISTANCE (PSI)">120.25<!S>   ——10h
<!S="DATE OF ORDER">JUNE 3, 2000<!S>         ——10i
<!S="DATE OF SHIPMENT">JUNE 21, 2000<!S>     ——10j
<!S="VOLUME OF ORDER (PIECES)">5000<!S>      ——10k
<!S="TYPE OF ITEM ORDERED">BEAKER<!S>        ——10l
<!S="BRAND OF ITEM ORDERED">SUPERTUF<!S>     ——10m

<TITLE>FIG. 2A</TITLE>
</HEAD>
<BODY>

<P>&NBSP;</P>
<P>JULY 23, 2000</P>

<P>MR. JOHN SMITH</P>
<P>VICE PRESIDENT OF OPERATIONS</P>
<P>ACME LABORATORIES</P>
<P>1000 W. MAIN ST.</P>
<P>LOS ANGELES, CA 90001</P>

<P>DEAR MR. SMITH:</P>

<P>	THIS LETTER IS IN REGARD TO YOUR JUNE 3, 2000 ORDER FROM US OF 5000 UNITS OF OUR SUPERTUF BRAND BEAKERS. I AM PLEASED TO INFORM YOU THAT YOUR ORDER ARRIVED AT OUR WAREHOUSE ON JULY 20, 2000. THE ORDER IS BEING SHIPPED TODAY.</P>

<P>SINCERELY,</P>

<P>&NBSP;</P>
<P>BOB RICHARDS</P>
<P>VP</P>
<P>GLASSCO. MFG., INC.</P>
</BODY>
</HTML>
```

INVOICE

| PRODUCT | CAPACITY | UNIT PRICE | QUANTITY | PRICE |
|---|---|---|---|---|
| SUPERTUF BEAKERS | 500mL | $0.50 | 5000 | $2,500 |

SHIP DATE: JULY 21, 2000

SHIPPING ADDRESS:

ACME LABORATORIES SUPPLIES
1000 W. MAIN STREET
LOS ANGELES, CA. 90001

*FIG. 3A*

```
<HTML>
<HEAD>
<META HTTP-EQUIV="CONTENT-TYPE" CONTENT="TEXT/HTML; CHARSET=WINDOWS-1252">
<META NAME="GENERATOR" CONTENT="MICROSOFT WORD 97">
<IS="SUBJECT"> BEAKER<IS>
<IS="SUBJECT"> DELIVERIES<IS>
<IS="SUBJECT"> SALES<IS>
<IS="CAPACITY (mL)">500<IS>
<IS="MATERIAL OF MANUFACTURE">TEMPERED GLASS<IS>
<IS="TEMPERATURE MAXIMUM(F)">212<IS>
<IS="TEMPERATURE MAXIMUM(C)">100<IS>
<IS="PRESSURE RESISTANCE (PSI)">120.25<IS>
<IS="DATE OF SHIPMENT">JUNE 21, 2000<IS>
<IS="VOLUME OF ORDER (PIECES)">5000<IS>
<IS="TYPE OF ITEM ORDERED">BEAKER<IS>
<IS="BRAND OF ITEM ORDERED">SUPERTUF<IS>
<IS="UNIT PRICE (DOLLARS)">0.50<IS>
<IS="SUBJECT">INVOICES<IS>
<TITLE>INVOICE</TITLE>
</HEAD>
<BODY LINK="#0000FF" VLINK="800080">

<P>INVOICE</P>
<TABLE BORDER CELLSPACING=1 CELLPADDING=7 WIDTH=570>
<TR><TD WIDTH="28%" VALIGN="TOP">
<P>PRODUCT</TD>
<TD WIDTH="17%" VALIGN="TOP">
<P>CAPACITY</TD>
<TD WIDTH="20%" VALIGN="TOP">
<P>UNIT PRICE</TD>
<TD WIDTH="19%" VALIGN="TOP">
<P>QUANTITY</TD>
<TD WIDTH="16%" VALIGN="TOP">
<P>PRICE</TD>
</TR>
<TR><TD WIDTH="28%" VALIGN="TOP">
<P>SUPERTUF BEAKERS</TD>
<TD WIDTH="17%" VALIGN="TOP">
<P>500mL</TD>
<TD WIDTH="20%" VALIGN="TOP">
<P>$0.50</TD>
<TD WIDTH="19%" VALIGN="TOP">
<P>5000</TD>
<TD WIDTH="16%" VALIGN="TOP">
<P>$2,500</TD>
</TR>
</TABLE>

<P>&NBSP;</P>
<P>SHIP DATE: JULY 21, 2000</P>
<P>SHIPPING ADDRESS:</P>
<P>ACME LABORATORIES SUPPLIES</P>
<P>1000 W. MAIN ST.</P>
<P>LOS ANGELES, CA 90001</P>
<P>&NBSP;</P> /BODY>
</HTML>
```

*FIG. 3B*

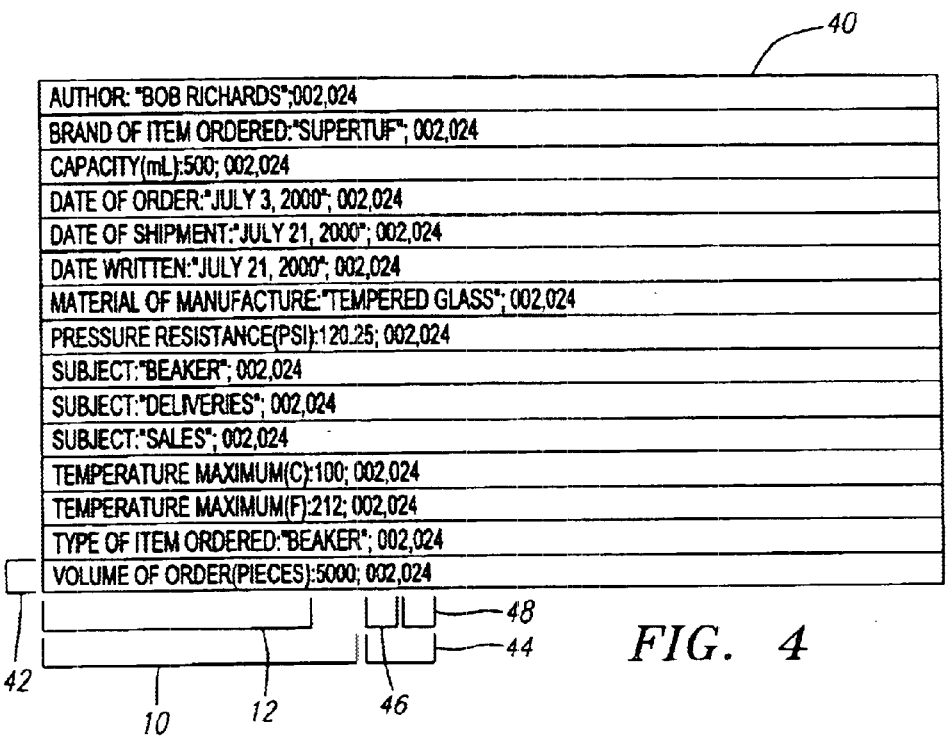
FIG. 4
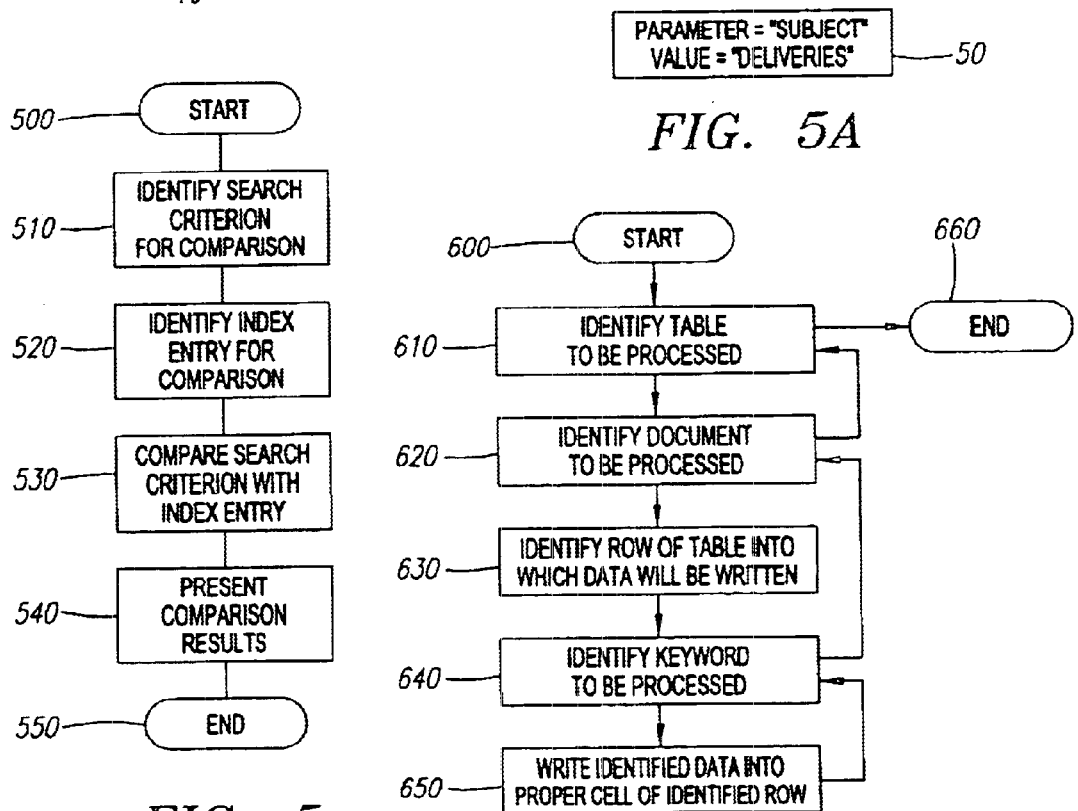
FIG. 5A
FIG. 5
FIG. 6

KEYWORD AND METHODS FOR USING A KEYWORD

NOTICE OF COPYRIGHTS

A portion of the disclosure of this patent document contains material that is subject to copyright protection. The copyright owner has no objection to the facsimile reproduction by anyone of the patent disclosure, as it appears in the Patent and Trademark Office patent files or documents, but otherwise reserves all copyright rights whatsoever.

1. Field of the Invention

The present invention relates generally to electronic data storage and retrieval. More particularly, the present invention relates to data parameterization, indexing technology and use of search indexes to search and retrieve data from data storage.

2. Description of Related Art

Electronic data/document storage and retrieval applications are relatively common. In fact, the Internet revolution has resulted in ever larger amounts of data being stored and retrieved using various application software, including database software, search engines, and browsers. Despite this massive increase in the amount of data available to be accessed, as technology advances consumers continue to demand faster and more accurate ways to access to that data.

Currently, every organization that attempts to develop and maintain an electronic information system today is faced with a significant challenge. It is widely known that 90% of the world's information is stored in the form of e-mails, faxes, reports and word processing documents. The remaining 10% is stored in spreadsheets and databases. The 90% portion is unstructured and chaotic. This unstructured data cannot be rapidly and accurately searched and retrieved using traditional indexing and searching methods, based either on the row-and-column format of spreadsheets and databases, or the keyword format currently used to search unstructured data collections.

Row-and-column format databases are an effective means for storing, searching and retrieving structured data. This structured data is typically represented as a series of records, each record containing several fields into which the actual data is written. Since every data item has associated with it a field name, and usually a specific data format (i.e. numeric, Boolean, text string, etc.), it is a relatively simple matter to create indexes of the values contained in one or more of the fields of the database. It is likewise relatively simple to search such databases using the indexes. However, this method does not work well with unstructured data, since such data is not easily capable of being modeled using the row-and-column format.

Currently, the favored method for searching unstructured data is by conducting a keyword search. In a keyword search, a user will provide one or more words that the user believes will be found within the text of the data items the user considers relevant, yet will not be found within the text of the data items the user considers irrelevant. More advanced keyword techniques allow the user to specify relations between the keywords, such as specifying that a pair of keywords must be located within the same sentence or paragraph, or within a specified number of words of each other.

Even with these techniques, however, keyword searches are still rather imprecise, and the user still is frequently presented with a significant amount of irrelevant data items. Additionally, relevant data is often not retrieved, because the keyword combination specified is different from the keyword combination in the data items to be searched. Thus, users are forced to waste time, both in reviewing all of the data items retrieved to determine which ones are relevant and in running multiple searches with variations on the keywords, to insure that no relevant data has been missed. Furthermore, these keyword searches are rather slow, since they must search the entire text of the documents to find keyword matches.

Thus, systems and methods are desirable for parameterizing, indexing and searching unstructured and semi-structured data more rapidly and accurately.

SUMMARY OF THE INVENTION

The present invention provides systems and methods for data storage and retrieval in which data is stored in a file storage system, data is associated with keywords, and desired data are identified and/or selected by conducting searches of indexes. The indexes map search criteria into the appropriate data.

In an aspect of a preferred embodiment of the invention, user-defined parameters of the data in the file storage system are created, values are associated with the parameters and each parameter-value pair is stored as a contiguous text string.

In another aspect of a preferred embodiment of the invention, different data items within the file storage system can have different parameters.

In another aspect of a preferred embodiment of the invention, the parameter-value pairs provide structure to unstructured data, creating semi-structured data.

In another aspect of a preferred embodiment of the invention, index entries are identified by comparing a search criterion to a parameter-value pair using a Boolean comparison of two text strings.

In another aspect of a preferred embodiment of the invention, an index of parameter-value pairs is used to translate semi-structured data into structured data.

DESCRIPTION OF THE DRAWINGS

FIG. 2B is the HTML source code for the document of FIG. 2A

FIG. 3A is a second hypertext document containing keywords, in accordance with a preferred embodiment of the invention.

FIG. 3B is the HTML source code for the document of FIG. 3A.

FIG. 4 is an index of the keywords contained in the hypertext document of FIGS. 2A–2B, in accordance with a preferred embodiment of the invention.

FIG. 5 is a flowchart of a method of identifying index entries, in accordance with a preferred embodiment of the invention.

FIG. 5A is a search criterion used in the method of FIG. 5.

FIG. 6 is a flowchart of a method of translating data, in accordance with a preferred embodiment of the invention.

DETAILED DESCRIPTION OF THE PREFERRED EMBODIMENTS

As used herein, a "document" may be an individual data file in a specified format (e.g. HTML, text, JPEG, BMP, etc.), or a folder or directory which itself includes other documents.

As used herein, a "file storage system" refers to a collection of documents, and optionally the associated index files and other supporting files. Exemplary file storage systems include DOS, UNIX, MacOS, and other computer operating systems. A preferred file storage system used to search, access and maintain the collection of documents is described in U.S. patent application Ser. No. 09/577,271 filed on May 23, 2000 now pending entitled "Hypertext-Based Database Architecture" and naming Chris Nuñez as the sole inventor, which application is hereby incorporated herein by reference, in its entirety, and is referred to herein as "the May 23, 2000 Nuñez application." Relationships between various documents in a file storage system may be defined within the file storage system itself, or externally. A file storage system is stored on a machine-readable medium.

As used herein, a "pointer" refers to information that is used to identify a relative or actual computer memory address, physical storage device address or virtual storage device address. A pointer can be the address or offset itself, or it can be data used to calculate or determine the address or offset.

The present invention provides systems and methods for data storage and retrieval in which data is stored in documents within a file storage system, and desired documents are identified and/or selected by conducting searches of index files which map criteria into the appropriate documents. The overall organization, architecture, and use of the file storage system may vary greatly depending upon the hardware and software operating environments involved. A more detailed description of one embodiment of such a file storage system is set forth in the May 23, 2000 Nuñez application, previously identified herein. The overall organization of an indexing scheme may also vary greatly, depending upon the hardware and software operating environments involved, as well as the nature of the data to be stored and retrieved. A more detailed description of one embodiment of such an indexing scheme is set forth in U.S. patent application Ser. No. 09/624,054 filed Jul. 24, 2000 entitled "Docubase Indexing, Searching and Data Retrieval" now pending and naming Chris Nuñez as the sole inventor, which application is hereby incorporated herein by reference, in its entirety, and is referred to herein as "the Jul. 24, 2000 Nuñez application."

Figure 1:
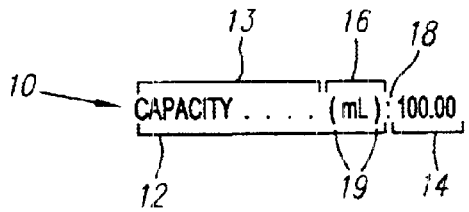
FIG. 1 is an example of a keyword in accordance with a preferred embodiment of the invention.
Figure 2A:
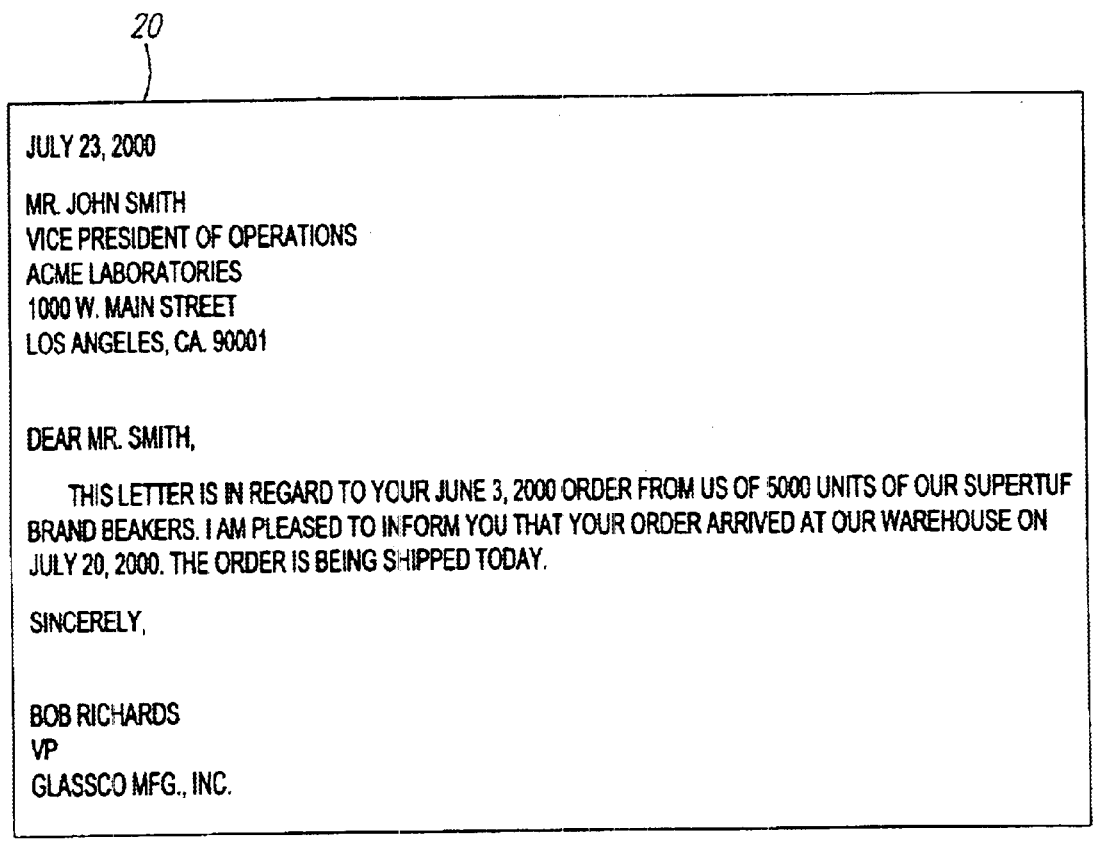
FIG. 2A is a first hypertext document containing keywords, in accordance with a preferred embodiment of the invention.

Referring to FIG. 1, a keyword 10 in accordance with a preferred embodiment of the invention is associated with, referring briefly to FIGS. 2A–2B, one of the collection of documents, a first document 20. Turning back to FIG. 1, the keyword 10 includes a parameter 12 and a parameter value 14. The parameter 12 is a name of a property or attribute possessed by the first document 20. The parameter 12 can describe data of various types, such as text, numeric, or memo types. The particular types of data described by the parameter 12 are design choices for those skilled in the art, and are not critical to the invention. In a preferred embodiment, the parameter 12 is capable of being defined either by the file storage system creator when the file storage system is first created, or later on by users of the file storage system.

The parameter value 14 is a value associated with the parameter 12. The parameter value 14 represents a particular value of the parameter 12, based upon the data contained within the first document 20 that the keyword 10 is associated with. The parameter value 14 preferably contains a single value, but it can contain multiple values.

In another preferred embodiment, the parameter 12 is further divided into a name part 13 and a units designator 16. The name part 13 names the property or attribute, as discussed above. The units designator 16 indicates the units of measurement of the parameter value 14 associated with the parameter 12. The units designator 16 is particularly useful when the parameter 12 describes a numeric data type. The units designator 16 can also be applied to other data types. For example, assuming the parameter value 14 is a name of a word processor file, then the units designator 16 could be an indicator of the particular word processing software used to create the file.

In a preferred embodiment, the keyword 10 is expressed as a contiguous text string, with the parts of the keyword being linked by delimiters 18, 19. Referring to FIG. 1, the parameter 12 is linked to the parameter value 14 by a first delimiter 18, a colon. The units designator 16 is linked to the name part 13 by a second delimiter 19, a pair of parentheses. Those skilled in the art will appreciate that the precise nature of the delimiters 18, 19 is a design choice that depends on the specifics of a particular implementation, and is not critical to the invention. In a preferred embodiment, the keyword 10, the parameter 12, and the parameter value 14 are expressed as variable-length text strings. In other embodiments, the keyword 10, the parameter 12, and/or the parameter value 14 are expressed as fixed-length text strings.

As discussed above, in a preferred embodiment the keyword 10 is associated with a first document 20. In an exemplary embodiment, turning to FIGS. 2A–2B, the first document 20 is a business letter, formatted as an HTML document. The first document 20 is preferably a semi-structured document, such as a hypertext, HTML or XML document. The first document 20 may, however, be an unstructured document, such as a text or graphics document. Those skilled in the art will also appreciate that an unstructured document such as a text document may be converted into a semi-structured HTML document, through the use of commercially available conversion software or proprietary algorithms.

The first document 20 has instances of the parameter 12 that describe the letter:

a) a first parameter instance 12$a$—Author, b) a second parameter instance 12$b$—Subject, c) a third parameter instance 12$c$—Date Written; instances of the parameter 12 that describe the beakers that are a subject of the letter:

d) a fourth parameter instance 12$d$—Capacity(ml), e) a fifth parameter instance 12$e$—Material of manufacture, f) a sixth parameter instance 12$f$—Temperature Maximum(F), g) a seventh parameter instance 12$g$—Temperature Maximum(C), h) a eighth parameter instance 12$h$—Pressure Resistance (PSI); and instances of the parameter 12 that describe the business transactions that are subjects of the letter:

i) a ninth parameter instance 12$i$—Date of order, j) a tenth parameter instance 12$j$—Date of shipment, k) a eleventh parameter instance 12$k$—Volume of order, l) a twelfth parameter instance 12$l$—Type of item ordered, m) a thirteenth parameter instance 12m—Brand of item ordered.

In the example of FIGS. 2A–2B, keyword instances 10a, 10b1, 10b2, 10b3, 10c, 10d, 10e, 10f, 10g, 10h, 10i, 10j, 10k, 10l, 10m, listed in Table 1, are created for and associated with the first document 20.

TABLE 1

| Keyword Instance | Keyword Contents | Parameter | Units Designator | Parameter Value |
|---|---|---|---|---|
| first keyword instance 10a | Author:"Bob Richards" | Author | N/A | "Bob Richards" |
| second keyword instance 10b1 | Subject:"Beaker" | Subject | N/A | "Beaker" |
| third keyword instance 10b2 | Subject :"deliveries" | Subject | N/A | "deliveries" |
| fourth keyword instance 10b3 | Subject:"sales" | Subject | N/A | "sales" |
| fifth keyword instance 10c | Date Written:"July 24, 2000" | Date Written | N/A | "July 24, 2000" |
| sixth keyword instance 10d | Capacity(ml):500 | Capacity | ml | 500 |
| seventh keyword instance 10e | Material of manufacture: "tempered glass" | Material of manufacture | N/A | "tempered glass" |
| eighth keyword instance 10f1 | Temperature Maximum(F):212 | Temperature Maximum | F | 212 |
| ninth keyword instance 10f2 | Temperature Maximum(C.):100 | Temperature Maximum | C | 100 |
| tenth keyword instance 10g | Pressure Resistance (psi): 120.25 | Pressure Resistance | psi | 120.25 |
| eleventh keyword instance 10h | Date of order:"June 3, 2000" | Date of order | N/A | "June 3, 2000" |
| twelfth keyword instance 10i | Date of shipment:"July 24, 2000" | Date of shipment | N/A | "July 24, 2000" |
| thirteenth keyword instance 10j | Volume of order(pieces):5000 | Volume of order | pieces | 5000 |
| fourteenth keyword instance 10k | Type of item ordered:"beaker" | Type of item ordered | N/A | "beaker" |
| fifteenth keyword instance 10l | Brand of item ordered:"SuperTuf" | Brand of item ordered | N/A | "SuperTuf" |

Each keyword instance 10a, 10b1, 10b2, 10b3, 10c, 10d, 10e, 10f, 10g, 10h, 10i, 10j, 10k, 10l, 10m is an instance of a keyword 10 that is associated with a particular parameter instance 12a, 12b, 12c, 12d, 12e, 12f, 12g, 12h, 12i, 12j, 12k, 12l, 12m and an associated parameter value 14. The keyword instances 10a, 10b1, 10b2, 10b3, 10c, 10d, 10e, 10f, 10g, 10h, 10i, 10j, 10k, 10l, 10m may be associated with the first document 20 at the time the first document 20 is created, or the keyword instances 10a, 10b1, 10b2, 10b3, 10c, 10d, 10e, 10f, 10g, 10h, 10i, 10j, 10k, 10l, 10m may be later associated with an existing first document 20. In a preferred embodiment, the keyword instances 10a, 10b1, 10b2, 10b3, 10c, 10d, 10e, 10f, 10g, 10h, 10i, 10j, 10k, 10l, 10m are associated with the first document 20 at the time the first document 20 is created, by being incorporated within the first document 20 as one or more tags 22. Other methods of association could include providing a link to a separate file of keywords 10 for the first document 20. The particular method of associating the keyword instances 10a, 10b1, 10b2, 10b3, 10c, 10d, 10e, 10f, 10g, 10h, 10i, 10j, 10k, 10l, 10m with the first document 20 is a design choice for those skilled in the art, and is not critical to the invention.

In a preferred embodiment, more than one keyword instance 10a, 10b1, 10b2, 10b3, 10c, 10d, 10e, 10f, 10g, 10h, 10i, 10j, 10k, 10l, 10m may contain the same instance of the parameter 12. In the exemplary embodiment of FIGS. 2A–2B, the parameter instance 12b labeled "Subject" is contained in the third keyword instance 10b1, the fourth keyword instance 10b2 and the fifth keyword instance 10b3. Thus a first document 20 discussing multiple instances of the same property can be managed by a preferred embodiment of the invention.

In a preferred embodiment, parameters 12 can also vary between documents within the file storage system. For example, turning to FIGS. 3A–3B, a second document 30 is an invoice for the business transaction referenced in the first document 20. The second document 30 contains parameter instances 12b, 12d, 12e, 12f, 12g, 12h, 12j, 12k, 12l, 12m that are also contained in the first document 20. Some of these parameter instances 12b, 12d, 12e, 12f, 12g, 12h, 12j, 12k, 12l, 12m have different parameter values 14 associated with them. The second document 30 also contains parameter instance 12n that is not found in the first document 20. The first document 20 also contains parameter instances 12a, 12c, 12i that are not found in the second document 30.

Turning now to FIG. 4, an index 40 of the keyword instances 10a, 10b1, 10b2, 10b3, 10c, 10d, 10e, 10f, 10g, 10h, 10i, 10j, 10k, 10l, 10m is created. In a preferred embodiment, the index 40 is created by using an automated process which parses the first document 20, gathers the keyword instances 10a, 10b1, 10b2, 10b3, 10c, 10d, 10e, 10f, 10g, 10h, 10i, 10j, 10k, 10l, 10m from the first document 20, and create an index entry 42 for each keyword 10a, 10b1, 10b2, 10b3, 10c, 10d, 10e, 10f1, 10f2, 10g, 10h, 10i, 10j, 10k, 10l. The index 40 preferably indexes each keyword 10 that actually appears in at least one of the documents within the file storage system. In another embodiment, the index 40 indexes each keyword 10 that could possibly appear within a document within the file storage system. A preferred embodiment of an index 40 is described in the Jul. 24, 2000 Nunez application. The precise method of creating the index 40 is a design choice for those skilled in the art, and is not critical to the invention.

In a preferred embodiment, the index 40 includes one or more index entries 42. Each index entry 42 is created by associating a keyword 10 with one or more body-to-record pointers 44. In a preferred embodiment, the keyword 10 is associated with the one or more body-to-record pointers 44 by combining the keyword 10 and the one or more body-to-record pointers 44 into a contiguous text string. The precise method of associating a keyword 10 with the one or more body-to-record pointers 44 is, however, a design choice for those skilled in the art, and is not critical to the invention.

In a preferred embodiment, the one or more body-to-record pointers 44 identify members of the collection of data files within the file storage system that contain the keyword 10 listed in the index entry 42. In a preferred embodiment, the one or more body-to-record pointers 44 include a volume designation 46 and a file designation 48. A detailed description of the one or more body-to-record pointers 44 of a preferred embodiment is contained in the Jul. 24, 2000 Nunez application. The precise nature of the one or more body-to-record pointers 44 is a design choice for those skilled in the art, and is not critical to the invention.

In the exemplary embodiment of FIG. 4, the index 40 is sorted alphabetically based upon the parameter 12 contained within each keyword 10 within each index entry 42. In a preferred embodiment, the index 40 is organized as described in the Jul. 24, 2000 Nunez application. In another embodiment the index 40 is sorted using a hashing function. The specifics of the organization scheme for the index 40 is a design choice for the user and is not critical to the invention.

In a preferred embodiment, once a keyword 10 is created, associated with one of the documents in the file storage system, and included in an index entry 42 of an index 40, turning to FIG. 5, the keyword 10 is then used in a identifying method 500 for identifying an index entry 42 that satisfies, turning briefly to FIG. 5A, a search criterion 50. Returning to FIG. 5, the identifying method 500 can be incorporated into a variety of other methods that operate on an index 40. For example, the identifying method 500 could be a step in a method for searching an index 40, a method for creating an index 40, or a method for deleting an index entry 42 from an index 40. A preferred method for searching an index 40 is described in the Jul. 24, 2000 Nunez application. The precise uses for the identifying method 500 are design choices for those skilled in the art, and are not critical to the invention.

The identifying method 500 includes a first step 510 where a search criterion 50 is identified. In a preferred embodiment, the search criterion 50 is a keyword 10 or a parameter 12. In a preferred embodiment, the search criterion 50 is represented as a contiguous text string. In another preferred embodiment, the search criterion 50 is converted into a contiguous text string if it is not already in that form. The search criterion 50 can come from a variety of sources. For example, a user of the file storage system can provide the search criterion 50. The search criterion 50 can alternatively be automatically generated by the file storage system itself. The particular source of the search criterion 50 is a design choice for those skilled in the art, and is not critical to the invention.

The identifying method 500 includes a second step 520, where an index entry 42, to be compared with the search criterion 50, is identified. The index entry 42 can be identified in a variety of ways. In a preferred embodiment, the index entry 42 is identified using the methods disclosed in the Jul. 24, 2000 Nunez application. In another embodiment, the index entry 42 is identified by iterating through all of the index entries 42 contained within the index 40. The precise method of identifying an index entry 42 for comparison with the criterion 40 is a design choice for those skilled in the art, and is not critical to the invention. The ordering of steps 510, 520 is also a design choice for those skilled in the art, and is not critical to the invention.

The identifying method 500 includes a third step 530, where the search criterion 50 identified in step 510 is compared with the index entry 42 identified in step 520. In a preferred embodiment, having represented the search criterion 50 as a contiguous text string, the search criterion 50 is then compared with the keyword 10 contained within the index entry 42 by making a Boolean logic comparison of each character of the search criterion 50 with the corresponding character of the index entry 42. A result is returned for each comparison, indicating if a match occurred. In an embodiment, the result of each character comparison is the numeral one (1) if the characters match, and the numeral zero (0) if they characters do not match. Representations of results of Boolean comparisons are well known to those skilled in the art, and the specific representation chosen is not critical to the invention.

The identifying method 500 includes a fourth step 540, where the results of the comparison are presented. The results of the comparison can be presented to a variety of entities. For example, the results of the comparison can be presented to another method of which the identifying method 500 is a part, such as a method for searching an index 40. The results of the comparison could also be provided directly to a user. The precise nature of the entity to which the results of the comparison are presented is a design choice for those skilled in the art, and is not critical to the invention. The identifying method 500 then terminates at step 550.

As a practical example of how the identifying method 500 might be used in conjunction with the index 40, assume that a searcher is looking for a document that discusses the subject of deliveries. The searcher provides a search criterion 50 that specifies a parameter of "subject" and a parameter value of "deliveries" to a search method (not shown) which includes the identifying method 500. This search criterion 50 is identified in step 510 as the search criterion 50 to be processed. Using the index search method disclosed in the Jul. 24, 2000 Nunez application, in step 520 the index entry 42 corresponding to the second keyword 10*b*1 is selected as the index entry 42 to be compared with.

The search criterion 50 is represented as, or converted to if necessary, the string:
subject: "deliveries"
which is compared with the second keyword 10*b*1, represented as the string:
subject: "beaker"
in step 530.

The character-by-character Boolean comparison of the two strings will generate a result set as follows, where a numeral one (1) signifies a match, and a numeral zero (0) signifies no match:
11111111101000000000.

These results are returned in step 540 to the search method (not shown) that the identifying method 500 is a component of. Since the search method (not shown) is looking for a complete match between the search criterion 50 and the second keyword 10*b*1, the search method (not shown), rejects the index entry 42, and continues searching.

Using the index search method disclosed in the Jul. 24, 2000 Nuñez application, the index entry 42 corresponding to the third keyword 10*b*2 is selected as the next index entry 42 to be processed, in step 520.

The search criterion 50 is represented as, or converted to if necessary, the string:
subject: "deliveries"
which is compared with the third keyword 10*b*2, represented as the string:
subject: "deliveries"
in step 530.

The character-by-character Boolean comparison of the two strings will generate a result set as follows, where a numeral one (1) signifies a match, and a numeral zero (0) signifies no match:
11111111111111111111.

These results are returned in step 540 to the search method (not shown) that the identifying method 500 is a component of. Since the search method (not shown) is looking for a complete match between the search criterion 50 and the third keyword 10*b*1, the search method (not shown), accepts the index entry 42. Depending on the precise nature of the search query the user presented to the search method (not shown), the search method (not shown) could continue searching the rest of the index 40 for other documents that satisfy the search criterion 50, or the search method (not shown) could halt upon locating a first document 20 that satisfied the search criterion 50. The particular actions of the search method (not shown) are a design choice for those skilled in the art, and are not critical to the invention.

As a second example of the identifying method 500, assume that the search criterion 50 used above specified only a parameter 12 of "subject", and had no parameter value 14 specified. The comparison with the second keyword 10*b*1 then returns the following result:
1111111
which is a complete match. This type of comparison allows the identifying method 500 to identify index entries 42 that match only the parameter 12 of a keyword 10 contained in an index entry 42. Thus, in an embodiment of the invention, meta-data searches as well as data searches are possible.

As a third example of the use of the identifying method 500, in an embodiment using the indexing scheme and index search method disclosed in the Jul. 24, 2000 Nuñez application, a more complex query is processed using the above described identifying method 500. Assume that a searcher is looking for all documents that discuss deliveries of beakers, the beakers having a capacity between 90 and 120 milliliters (ml) and a maximum temperature tolerance between 212 and 1000 degrees Fahrenheit (F.). The searcher provides the query:

Subject=deliveries
AND
Subject=beaker
AND
Capacity(ml)=90 to 120
AND
Temperature(F)=212 to 1000

The search is done in four passes. In the first pass, the search method (not shown) calls the identifying method 500 and passes the first search criterion
subject: "deliveries"
to the identifying method 500. Following the steps outlined above, the identifying method 500 returns all the records that contain the keyword matching the first search criterion.

In the second pass, the search method (not shown) calls the identifying method 500 and passes the second search criterion
subject: "beaker"
to the identifying method 500. Following the steps outlined above, the identifying method 500 returns all the records that contain the keyword matching the second search criterion.

In the third pass, the third search criterion is a compound search criterion, which specifies a range of values to be located. The third pass extracts from the third search criterion a first sub-criterion:
capacity(ml): 90
that is passed to the identifying method 500. The identifying method 500 returns the index entry, matching the first sub-criterion, that is located first in the index 40. The third pass then extracts from the third search criterion a second sub-criterion:
capacity(ml): 120
that is passed to the identifying method 500. The identifying method 500 returns the index entry, matching the second sub-criterion, that is located last in the index 40. The third pass of the search method then returns all records pointed to by all index entries 42 in the index 40 that are located between the index entry identified by the first sub-criterion and the index entry identified by the second sub-criterion.

The fourth pass is treated similarly to the third pass. A third sub-criterion of
temperature(F): 212
is extracted from the fourth search criterion an used by the identifying method 500 to locate the top of the range of index entries 42 in the index 40 that satisfy the fourth search criterion. A fourth sub-criterion of
temperature(F): 1000
is extracted from the fourth search criterion an used by the identifying method 500 to locate the bottom of the range of index entries 42 in the index 40 that satisfy the fourth search criterion. The fourth pass then returns all records pointed to by the index entries 42 within the range.

In an embodiment, upon completion of all four passes, the search method returns the conjunction of the result sets from the four passes, since the original query was seeking records that met all four search criteria. In another embodiment, the second pass only searches the records returned by the first pass, the third pass only searches the records returned by the second pass, and the fourth pass only searches the records returned by the third pass. Thus the first pass generates, for example, 100 matches. The second pass searches those 100 matches and returns 50 matches from within the previous 100. The third pass searches those 50 matches and returns 30 matches from within the previous 50. The fourth pass searches those 30 matches and returns a final result set of five matches from within the previous 30. The precise method for combining the result sets of the passes of the search method is a design choice for the user, and is not critical to the invention.

Figure 7:
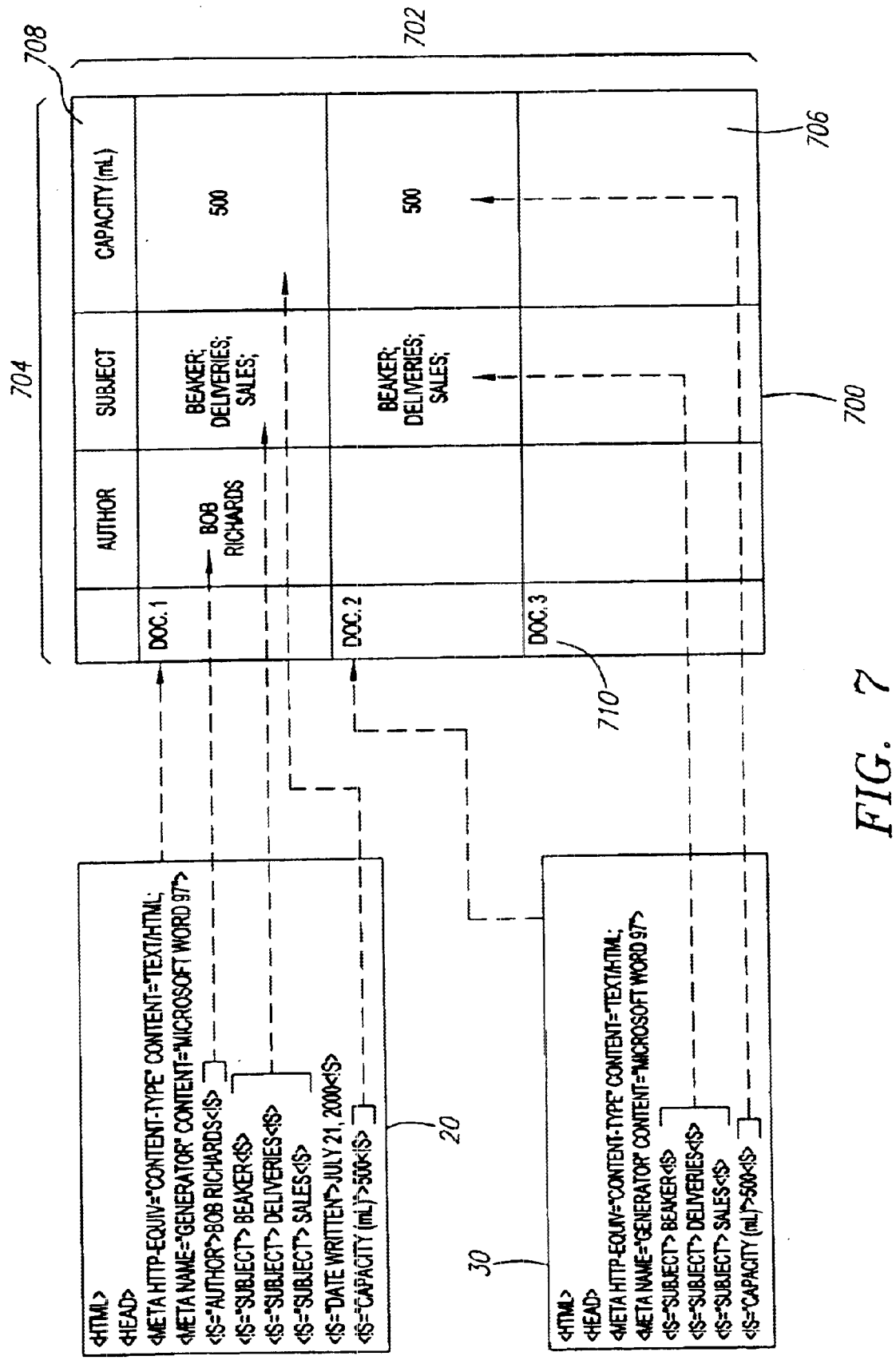
FIG. 7 shows how data stored in hypertext format is translated into row-and-column format, in accordance with a preferred embodiment of the invention.

In a preferred embodiment, shown in FIG. 6, a keyword 10 is used in a converting method 600 for converting data from an unstructured or semi-structured format into a row-and-column format, such as, turning to FIG. 7, a table 700. The row-and-column formatted data can then be accessed and manipulated by conventional database systems.

The table 700 contains one or more rows 702 and one or more columns 704, which together create one or more cells 706 for containing the data extracted from the first document 20 and the second document 30. Each column 704 has a column identifier 708 associated with it. In a preferred embodiment, each column identifier 708 is a parameter 12 of a keyword 10 associated with data stored in the file storage system. Each row 702 has a row identifier 710 associated with it. In a preferred embodiment, the row identifier 710 identifies the first document 20 or the second document 30 from which the data contained in the cells 706 of the row 702 came from. Each cell 706 can be identified by the combination of the row 702 and the column 704, or the row identifier 710 and the column identifier 708, of which the cell 706 is a member. The data within each cell 706 can be stored in a variety of formats. In an embodiment, each cell 706 contains a single value. In another embodiment, each cell 706 contains multiple values for a single parameter 12, organized in some fashion. The particular formats for storing data in the cells 706 are design choices for those skilled in the art, and are not critical to the invention.

The converting method 600 includes a first step 610, where the table 700 is identified as the next table to enter data into. In an embodiment, the table 700 is created in step 610. In an embodiment, a column 706 of the table 700 is created for each parameter 12 that identifies data to be converted. In another embodiment, the table 700 is an existing table of a conventional row-and-column database (not shown). The particular method of identifying the table 700 is a design choice for those skilled in the art and is not critical to the invention.

The converting method 600 includes a second step 620, where the first document 20 to be converted is identified. In a preferred embodiment, the first document 20 is stored in the file storage system described in the May 23, 2000 Nunez application. In a preferred embodiment, the first document 20 is identified by searching an index file 40 and retrieving a collection of index entries 42 that point to the first document 20. In a preferred embodiment, the first document 20 itself is not retrieved, rather the data stored within the first document 20 is retrieved directly from the parameter values 14 contained within the index entries 42 that point to the first document 20. In another embodiment, the first document 20 is retrieved. The particular method of identifying the first document to be converted is a design choice for those skilled in the art, and is not critical to the invention.

The converting method 600 includes a third step 630, where a row 702 of the table 700 is identified for insertion of the data from the first document 20. In an embodiment, the row 702 is created in step 630. In another embodiment, the row 702 is an existing row of the table 700. The particular method of identifying the row 702 is a design choice for those skilled in the art, and is not critical to the invention.

The converting method 600 includes a fourth step 640, where a first keyword instance 10a is identified as the next keyword 10 to be processed. In a preferred embodiment, the first keyword instance 10a is identified by searching an index file 40, or a subset of an index file 40, and locating an index entry 42 that points to the first document 20, using the search method described in the Jul. 24, 2000 Nunez application. The precise method of identifying the first keyword instance 10a is, however, a design choice for those skilled in the art, and is not critical to the invention.

The converting method 600 includes a fifth step 650 where the data associated with the first keyword instance 10a is written to the row 702 identified in step 630. In a preferred embodiment where the first keyword instance 10a is contained in an index entry 42 of the index 40 that was searched in the fourth step 640, the data associated with the first keyword instance 10a is extracted from the parameter value 14, stored in the index entry 42 of the index 40, that is associated with the first keyword instance 10a. In another embodiment, the data associated with the first keyword instance 10a is instead extracted directly from the first document 20, by locating the first document 20 using the body-to-record pointer 44 of the index entry 42 containing the first keyword instance 10a. In a preferred embodiment, the data associated with the first keyword instance 10a is written to the cell 706 that is in the column 704 bearing the column identifier 708 that matches the first parameter instance 12a of the first keyword instance 10a. In an embodiment, if the table 700 does not have a column 704 bearing the column identifier 708 that matches the first parameter instance 12a of the first keyword instance 10a, then such a column 704 is created.

The converting method 600 then returns to step 640, where the next keyword 10 to be processed is identified. Once all keywords 10 in the first document 20 have been processed, the converting method 600 returns to step 620, where the next document to be processed is identified. Once all documents that are to be converted into the table 700 have been processed, the converting method 600 returns to step 610 where it identifies the next table to be processed. Once all tables 700 have been processed, the converting method 600 terminates in a sixth and final step 660.

Several preferred embodiments of a system of and method for using keywords in parameter-based searching of text, and many of the system's attendant advantages, have thus been disclosed. It will be apparent, however, that various changes may be made in the system's or method's form and components without departing from the spirit and scope of the invention, the embodiments hereinbefore described being merely preferred or exemplary embodiments thereof. Therefore, the invention is not to be restricted or limited except in accordance with the following claims and their legal equivalents.

I claim:

1. A method for converting data contained in a file storage system into a structured database, the data associated with a keyword, the keyword including a parameter and a parameter value, the parameter describing an attribute of the data, the parameter value being based upon the data, comprising:

reading the data from a plurality of records, the records included in a document-based database including a plurality of documents stored in the file storage system, each of the plurality of records comprising one or more of the plurality of documents not stored in database tables;

writing at least one value based upon the data into a data field in a database table in the structured database; and writing an index in the database table based upon the keyword.

2. The method of claim 1, wherein the data table has a row and a column.

3. The method of claim 1, wherein the data field has a column identifier and a row identifier.

4. The method of claim 3, wherein the column identifier is associated with the parameter.

5. The method of claim 3, wherein the row identifier is associated with the data.

6. The method of claim 1, wherein the data contained in a file system includes a document.

7. The method of claim 6, wherein the row identifier is associated with the document.

8. The method of claim 1, wherein the value based upon the data further comprises the parameter value.

9. The method of claim 1, wherein the value based upon the data further comprises the data contained in the file storage system.

* * * * *